(12) United States Patent
Chiang

(10) Patent No.: US 8,447,437 B2
(45) Date of Patent: May 21, 2013

(54) ASSISTANT DRIVING SYSTEM WITH VIDEO RECOGNITION

(76) Inventor: Yan-Hong Chiang, Taipei (TW)

(*) Notice: Subject to any disclaimer, the term of this patent is extended or adjusted under 35 U.S.C. 154(b) by 334 days.

(21) Appl. No.: 12/952,186

(22) Filed: Nov. 22, 2010

(65) Prior Publication Data

US 2012/0130561 A1    May 24, 2012

(51) Int. Cl.
    *G08G 1/16*      (2006.01)
(52) U.S. Cl.
    USPC ............ 701/1; 340/901; 340/903; 340/932.2; 340/945; 340/958; 340/961; 340/963; 340/435; 340/436; 348/104; 348/106; 348/107; 348/155; 348/260; 701/36; 701/41; 701/45; 701/65; 701/69; 701/70; 701/78; 701/82; 701/83; 701/84; 701/85; 701/99; 701/300; 701/301; 701/302

(58) Field of Classification Search
None
See application file for complete search history.

(56) References Cited

U.S. PATENT DOCUMENTS

| | | | | |
|---|---|---|---|---|
| 6,191,704 B1* | 2/2001 | Takenaga et al. | ............. | 340/903 |
| 8,311,720 B2* | 11/2012 | Pelosse | ............................. | 701/96 |
| 2005/0225477 A1* | 10/2005 | Cong et al. | ....................... | 342/70 |
| 2008/0055114 A1* | 3/2008 | Kim et al. | ...................... | 340/937 |
| 2008/0143509 A1* | 6/2008 | Wang et al. | .................... | 340/471 |
| 2009/0268947 A1* | 10/2009 | Schaufler | ....................... | 382/104 |
| 2010/0066527 A1* | 3/2010 | Liou | ........................... | 340/461 |
| 2010/0253541 A1* | 10/2010 | Seder et al. | ................... | 340/905 |
| 2010/0253542 A1* | 10/2010 | Seder et al. | ................ | 340/932.2 |
| 2010/0253595 A1* | 10/2010 | Szczerba et al. | .................. | 345/7 |
| 2010/0253918 A1* | 10/2010 | Seder et al. | ..................... | 353/13 |
| 2010/0292886 A1* | 11/2010 | Szczerba et al. | ................ | 701/29 |

* cited by examiner

*Primary Examiner* — Jonathan M Dager

(57) ABSTRACT

An assistant driving system with video recognition includes a camera array capturing environment images for the environment around the vehicle, an image recognition unit identifying environment objects and their image, location, color, speed and direction from the environment images, an environment monitor and control unit receiving the information generated by the image recognition unit and creating the rebuild environment information for the vicinity of the vehicle as well as judging the space relationship between the vehicle and the environment objects to generate the warning information, a video recognition display unit showing a single image for the rebuild environment information, a vehicle warning unit performing the processes corresponding to the warning information, a vehicle driving unit generating the driving control command based on the rebuild environment information, and a vehicle controlling unit receiving the driving control command to control the throttle, brake or steering wheel of the vehicle.

10 Claims, 3 Drawing Sheets

ASSISTANT DRIVING SYSTEM WITH VIDEO RECOGNITION

BACKGROUND OF THE INVENTION

1. Field of the Invention

The present invention generally relates to an assistant driving system, and more specifically to a vehicle assistant system with video recognition.

2. The Prior Arts

It has been a crucial topic for the vehicle industry to improve the safety of driving, especially for car. Many vehicle manufactures developed various assistant devices by use of infrared, ultrasonic, microwave, or radio frequency to detect the obstacles around the vehicle, so as to warn or remind the driver of watching the current driving situation. For example, Adaptive Cruise Control (ACC) system is equipped in TOYOTA Camry series to prevent collision with the front car. Another example is Side Assist System, which is used in AUDI series to provide appropriate warning when the car turns to left or right.

However, the effective detection range or working distance for infrared or ultrasonic are short and the detection function is easily interfered by environment noise. The working power of microwave or radio frequency has to be reinforced to increase the detection range such that the health of human is endangered and the manufacturing cost is pretty high. Furthermore, the worst weakness for the above designs is that generally only one target (a car, passenger or any object on the road) is monitored, and some nonmetal objects are not detected, such as lane signs on the road or plastic obstacles.

Moreover, most advanced central control systems equipped in the car provide the images of front, back, left and right sides to display on a display device installed at the front-right side of the driver to assist in handling the driving information, such as multiple sub-images on one screen used in LUXGEN series or BLIS (Blind Spot Information System) in VOLVO S40 series. However, the driver has to simultaneously monitor three rearview/side mirrors and one screen during driving, and tends to become dizzy. It is possible to increase the risk of driving, especially for those drivers with slow response to the abrupt or emergent situation. Therefore, it is desired to provide a vehicle assistant system with video recognition showing one single image without monitoring all rearview/side mirrors so as to overcome the drawbacks in the prior arts.

SUMMARY OF THE INVENTION

A primary object of the present invention is to provide a vehicle assistant system with video recognition, including a camera array capturing environment images, an image recognition unit identifying environment objects and their image, location, color, speed and direction from the environment images, an environment monitor and control unit receiving the information generated by the image recognition unit for creating the rebuild environment information of the vicinity of the vehicle and judge the special relationship between the vehicle and the environment objects to generate the warning information, a video recognition display unit showing a single image for the rebuild environment information, a vehicle warning unit performing the processes with respect to the warning information, a vehicle driving unit generating the driving control command based on the rebuild environment information, and a vehicle controlling unit receiving the driving control command to control the throttle, brake or steering wheel of the vehicle.

Therefore, the vehicle assistant system of the present invention provides video recognition function, which may be installed on a car, ship or airplane to assist the driver. Furthermore, the vehicle assistant system can be used to achieve the function of recording driving video, auto driving or parking distance control, or generate the information or signal for anti-collision of front, rear or side vehicles, or warn the dangerous driving so as to improve the safety of driving.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

Figure 1:
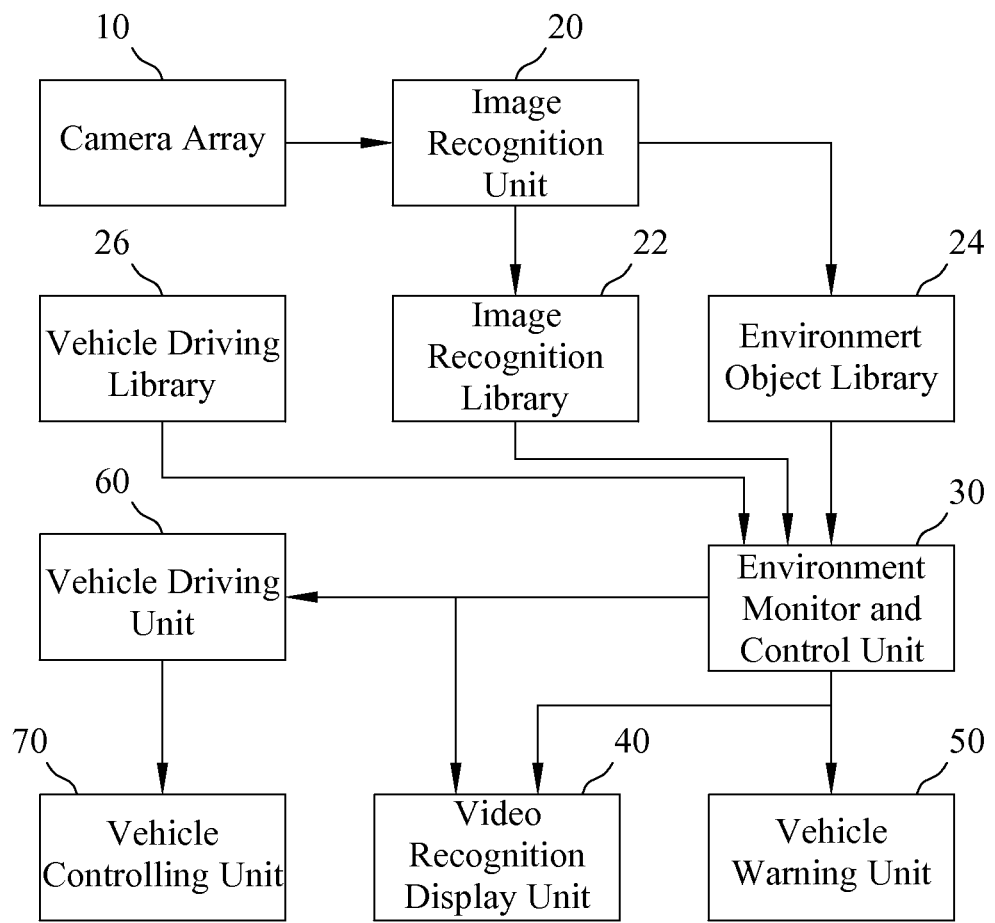
FIG. 1 shows a functional block diagram to illustrate a vehicle assistant system with video recognition according to the present invention.
Figure 2:
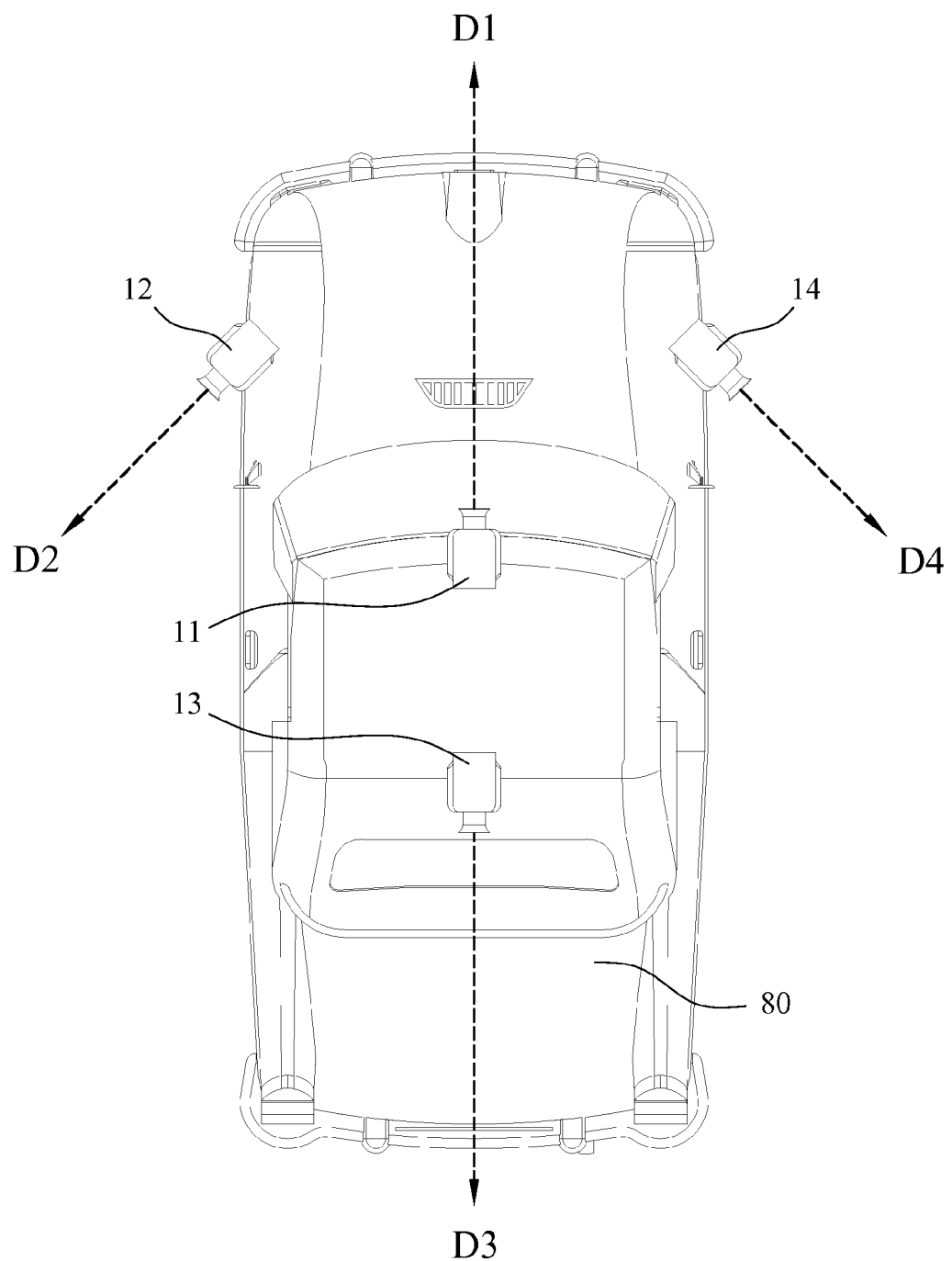
FIG. 2 shows an exemplary installment of the camera array on the car according to the present invention.

Please refer to FIGS. 1 and 2. FIG. 1 shows the functional block diagram to illustrate the vehicle assistant system with video recognition according to the present invention and FIG. 2 illustrates one exemplary installment of the camera array on the car. As shown in FIG. 1, the vehicle assistant system of the present invention includes at least a camera array 10, at least an image recognition unit 20, an environment object library 22, an image recognition library 24, a vehicle driving library 26, an environment monitor and control unit 30, a video recognition display unit 40, a vehicle warning unit 50, a vehicle driving unit 60, and a vehicle controlling unit 70. The vehicle assistant system can be installed on the vehicle, such as the car 80 in FIG. 2, so as to provide the function of video recognition to the driver of the car 80 to improve the safety of driving.

It should be noted that the car 80 in FIG. 2 is only an example of application to illustrate the aspects of the present invention, and this is not intended to limit the scope of the present invention. Thus, the vehicle assistant system with video recognition according to the present invention can also be applied to a ship or airplane.

Each camera array 10 includes at least a camera, such as the first, second, third, and fourth cameras 11, 12, 13, and 14 in FIG. 2, directed toward different directions to capture the environment of the car 80 and generate a plurality of environment images accordingly. For example, the first, second, third, and fourth cameras 11, 12, 13, and 14 face toward the directions of the front D1, left D2, back D3, and right D4, respectively. To improve the effective range and distance of monitoring, each camera array 10 may further be equipped with some zoom, wide-angle or IR lens, or the number of the cameras directly increases to monitor the environment in more directions of the car 80.

Each image recognition unit 20 receives the environment images via suitable video medium electrically connected with camera array 10, and simultaneously identifies and recognizes at least one environment object and the corresponding image, location, color, speed and direction of the environment object from the environment images. Specifically, the environment object may include the other vehicles, lane lines, warning words on the road, text traffic signs, obstacles, passengers, buildings or guard trails around the car 80.

The above video medium may include one of the USB (Universal Serial Bus) and video signal cables. The video signal cable could be one of the composite, component, High Definition Multimedia Interface (HDMI), RGB, YUV, CCIR601 and CCIR656 signal cable.

The environment object library 22 is connected with image recognition unit 20 to receive and store the image of the environment object, and the image recognition library 24 is also connected with image recognition unit 20 to receive and store the location, color, speed and direction of the environment object.

The vehicle driving library 26 possesses the dynamic and static information of the car 80. The dynamic information includes the GPS data, dynamic speed and direction of the car 80, and the static information contains the safe braking distance, turning radius, accelerating level, safe separating distance or the length, width and height of the car 80, which are predetermined and stored.

The environment monitor and control unit 30 is connected with the environment object library 22, image recognition library 24 and vehicle driving library 26 to read the image, location, color, speed and direction of the environment object, and then generate the rebuild environment information representing the surroundings of the car 80. The environment monitor and control unit 30 further generates the warning information by judging the space relationship between the car 80 and the environment object based on the rebuild environment information, such as static and dynamic space relationship. For example, the static space relationship may include relative distance and direction, and the dynamic space relationship may include relative speed. The relative speed is calculated by dynamic speed stored in the vehicle driving library 26 and the distance difference of the environment object.

For instance, the environment monitor and control unit 30 may generate the warning information when the relative distance between the car 80 and the environment object is less than a predetermined safe distance, and the safe distance depend on the relative speed between the car 80 and the environment object, the safe distance increases by at least 6 meters as relative speed between the vehicle and the environment object increases by 10 km/hr. Additionally, the predetermined safe distance depends on the type of the cars 80 and is previously adjusted in the vehicle driving library 26. Especially, the current speed and direction of the car 80 is always updated and provided to the environment monitor and control unit 30 to dynamically judge the driving situation.

The video recognition display unit 40 is use to implement the function of displaying such that the rebuild environment information from the environment monitor and control unit 30 is received and one single image is displayed in one of the bird's view and recognition figure. For example, the environment objects corresponding to the directions of the front D1, left D2, back D3, and right D4 are located located in the directions of the front, left, back, and right of the car 80, respectively, so as to assist the driver to fully and clearly understand the traffic situation around the car 80.

The vehicle warning unit 50 receives the warning information from the environment monitor and the control unit 30 and generates the sound, light or vibration accordingly to remind the driver.

The vehicle driving unit 60 receives the rebuild environment information from the environment monitor and the control unit 30 and generates the control command based on the rebuild environment information. The vehicle driving unit 60 is connected to the vehicle controlling unit 70 via the transfer medium and then converted into the corresponding control command, which is used to control at least one of the throttle, brake and steering wheel of the car 80.

The above transfer medium may include one of wire and wireless medium. The wire medium comprising one of LIN (Local Interconnect Network), CAN (Controller Area Network) and TCP/IP (Transmission Control Protocol/Internet Protocol). The wireless medium may include one of infrared medium using IrDA (Infrared Data Association) protocol, radio frequency medium using Bluetooth protocol or WIFI/WIMAX/3G/LTE that are used in computer or mobile phone communication.

Figure 3:
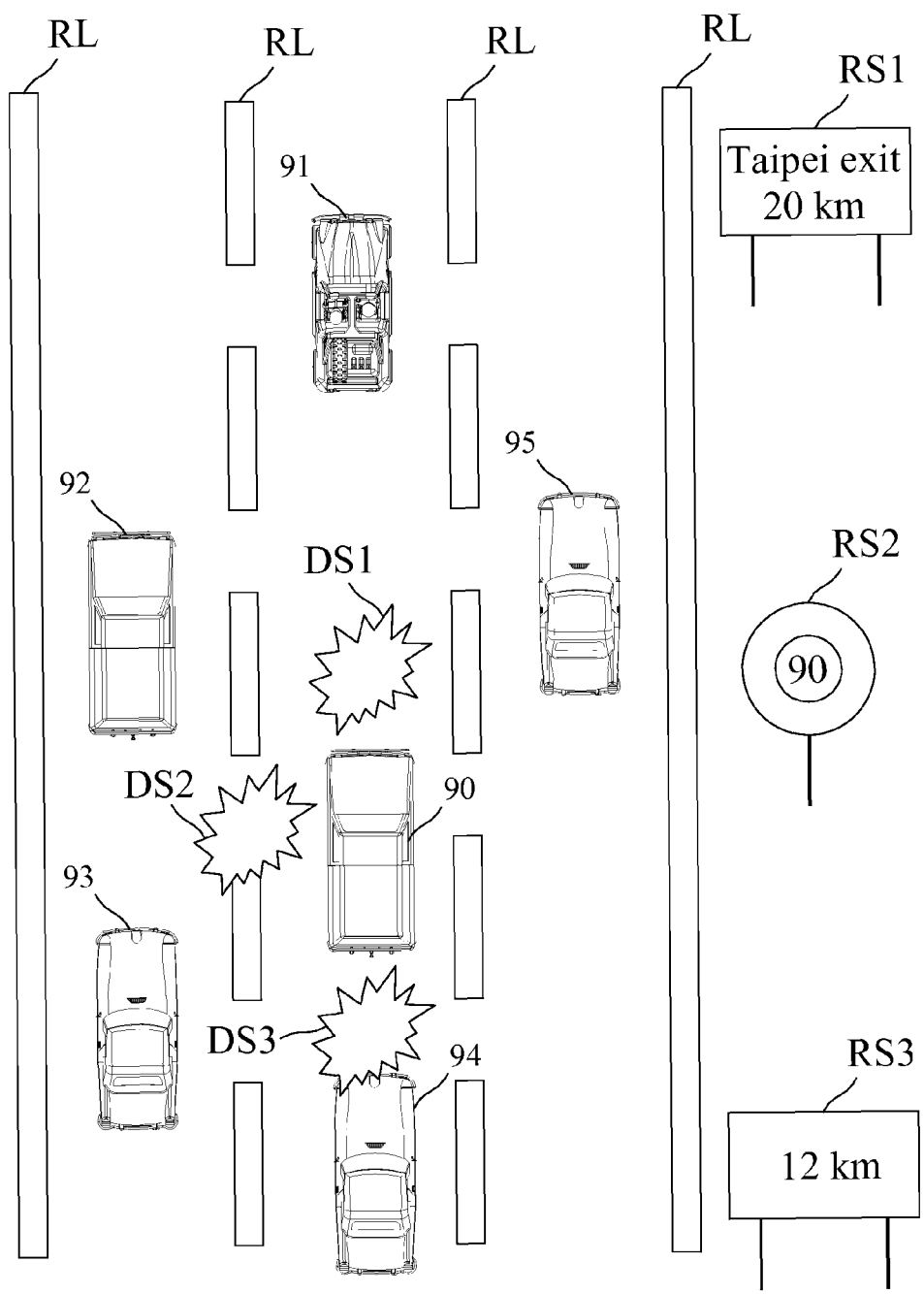
FIG. 3 illustrates one exemplary single environment image of the vehicle assistant system according to the present invention.

Please refer to FIG. 3 for further understanding the characteristics of the present invention. As shown in FIG. 3, the single image displayed in the video recognition display unit 40 includes the present car 90, the first, second, third, fourth, fifth cars 91, 92, 93, 95 and 95, the lane line RL, the first, second and third road signs RS1, RS2 and RS3, the first, second and third warning icons DS1, DS2 and DS3. The present car 90 is equipped with the vehicle assistant system of the present invention. The first, second, third, fourth, fifth cars 91, 92, 93, 94 and 95 are around the present car 90. The lane line RL represents the separating dashed or solid line on the road to distinguish two adjacent car lanes. The first, second and third road signs RS1, RS2 and RS3 indicate the next exit, speed limit, and mileage, respectively.

Furthermore, the first, second and third warning icons DS1, DS2 and DS3 in FIG. 3 are displayed in the single image by the video radar display unit 40, which correspond to the warning information received. The first warning icon DS1 illustrates the first car 91 is too close to the present car 90 and possibly has the risk of collision. The second warning icon DS2 indicates the risk of side collision because the third car 93 is too close to the present car 90, or far away the original lane, or preparing to switch to the lane of the present car 90, or the present car 90 is switching to the left lane. The third warning icon DS3 is used to show that the fourth car 94 is too close and may collide with the present car 90.

It should be noted that the environment objects shown in FIG. 3 are located on a one-way road as an example, but the single image of the present invention may substantially include a plurality of lanes on a two-way road.

The assistant driving system of the present invention may further include a CSFDR (Crash Survivable Flight Data Recorder) (not shown), connected with the environment monitor and the control unit 30 for receiving and recording the image, location, color, speed and direction of each environment object during driving.

As another aspect of the present invention, the assistant driving system with video recognition can be used to implement auto driving or parking distance control, or generate the information or signal for anti-collision of front, rear or side vehicles, or warn the dangerous driving. The assistant driving system may be installed on a larger vehicle, such as an airplane or ship. Additionally, the assistant driving system of the present invention can help the driver get rid of any possible severe damage of collision due to dead space resulting from the huge size of the vehicle, so as to further improve the safety of driving.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An assistant driving system with video recognition, having video recognition function and installed on a vehicle to assist a driver to steer the vehicle, comprising:
   at least a camera array, each having at least a camera to capture a plurality of environment images in a different direction for an environment of the vehicle;
   at least an image recognition unit, receiving the environment images through a video medium electrically connected with the camera array, and identifying at least an environment object and an image, location, color, speed and direction for the environment object from the environment images;
   an environment object library, connected with said image recognition unit to receive and store said image of the environment object;
   an image recognition library, connected with said image recognition unit to receive and store said location, color, speed and direction of the environment object;
   a vehicle driving library, having dynamic and static information for the vehicle, said dynamic information comprising dynamic speed and direction of the vehicle, said static information predetermined for the vehicle comprising braking distance, turning radius, accelerating level and safe distance, and length, width and height of the vehicle;
   an environment monitor and control unit, connected with said environment object library, said image recognition library and said vehicle driving library to receive the image, location, color, speed and direction of the environment object, create rebuild environment information for the vicinity of the vehicle, and generate warning information by judging a space relationship between the vehicle and the environment object based on the rebuild environment information;
   a video recognition display unit, receiving the rebuild environment information and showing a single image corresponding to the rebuild environment information; and
   a vehicle warning unit, receiving the warning information generated by the environment monitor and control unit, and performing processes corresponding to the warning information, including sound, light or vibration, so as to warn and remind the driver.

2. The system as claimed in claim 1, wherein said vehicle comprises at least one of a car, ship and airplane.

3. The system as claimed in claim 1, further comprising:
   a vehicle driving unit, receiving the rebuild environment information and generating a driving control command based on the rebuild environment information; and
   a vehicle controlling unit, receiving the driving control command through a transfer medium and generating a control command to control at least one of a throttle, brake or steering wheel of the vehicle.

4. The system as claimed in claim 1, wherein said camera is directed toward at least one of front, back, left and right of the vehicle.

5. The system as claimed in claim 1, wherein said space relationship comprises static and dynamic space relationships, said static space relationship comprises relative distance and direction, and said dynamic space relationship comprises relative speed between the vehicle and the environment object.

6. The system as claimed in claim 1, wherein said single image is shown by one of a bird's eye view and a recognition figure.

7. The system as claimed in claim 1, wherein said warning information is generated by the environment monitor and control unit when a relative distance between the vehicle and the environment object is less than a predetermined safe distance.

8. The system as claimed in claim 7, wherein said predetermined safe distance increases by at least 6 meters as relative speed between the vehicle and the environment object increases by 10 km/hr.

9. The system as claimed in claim 1, wherein said transfer medium comprises one of wire and wireless medium, said wire medium comprising one of LIN (Local Interconnect Network), CAN (Controller Area Network) and TCP/IP (Transmission Control Protocol/Internet Protocol), said wireless medium comprising one of infrared medium using IrDA (Infrared Data Association) protocol, radio frequency medium using Bluetooth protocol and WIFI/WIMAX/3G/LTE used in communication for a computer and a mobile phone.

10. The system as claimed in claim 1, wherein said video recognition display unit further receives the warning information from the environment monitor and control unit, and said single image shows at least an icon corresponding to the warning information.

* * * * *